United States Patent
Stouffer et al.

(10) Patent No.: US 6,462,648 B1
(45) Date of Patent: Oct. 8, 2002

(54) VEHICLE SECURITY SYSTEM

(75) Inventors: Peter Stouffer, Davisburg; Michael Lindsey, Royal Oak, both of MI (US)

(73) Assignee: Code Systems, Inc., Madison Heights, MI (US)

( * ) Notice: Subject to any disclaimer, the term of this patent is extended or adjusted under 35 U.S.C. 154(b) by 0 days.

(21) Appl. No.: 09/268,098

(22) Filed: Mar. 13, 1999

(51) Int. Cl.[7] .............................................. B60R 25/10
(52) U.S. Cl. .................. 340/426; 340/425.5; 340/531; 340/539; 340/825.69; 340/825.72; 180/287; 307/10.2
(58) Field of Search ........................ 340/425.5, 426, 340/825.69, 825.72, 539, 527, 528, 531; 341/174, 175, 176; 307/10.2, 10.4; 180/287

(56) References Cited

U.S. PATENT DOCUMENTS

| | | |
|---|---|---|
| 3,585,584 A | 6/1971 | Behrend |
| 3,614,734 A | 10/1971 | Davis |
| 3,668,675 A | 6/1972 | Joens et al. |
| 3,670,301 A | 6/1972 | Douglas |
| 3,703,714 A | 11/1972 | Andrews |
| 3,949,219 A | 4/1976 | Crouse |
| 3,987,408 A | 10/1976 | Sassover et al. |
| 4,143,368 A | 3/1979 | Route et al. |
| 4,159,467 A | 6/1979 | Ballin |
| 4,161,721 A | 7/1979 | Conklin et al. |
| 4,258,353 A | 3/1981 | Carlson |
| 4,383,242 A | 5/1983 | Sassover et al. |
| 4,471,659 A | 9/1984 | Udd et al. |
| 4,535,333 A | 8/1985 | Twardowski |
| 4,584,569 A | 4/1986 | Lopez et al. |
| 4,595,902 A | 6/1986 | Proske et al. |
| 4,626,848 A | 12/1986 | Ehlers |
| 4,631,527 A | 12/1986 | De Witt et al. |
| 4,652,860 A | 3/1987 | Weishaupt et al. |
| 4,701,751 A | 10/1987 | Sackett |
| 4,719,460 A | 1/1988 | Takeuchi et al. |
| 4,754,255 A | 6/1988 | Sanders et al. |
| 4,794,368 A | 12/1988 | Grossheim et al. |
| 4,837,567 A | 6/1989 | Kleefeldt et al. |
| 4,862,139 A | 8/1989 | Fukamachi et al. |
| 4,866,417 A | 9/1989 | DeFino et al. |
| 4,868,915 A | 9/1989 | Anderson, III et al. |
| 4,887,065 A | 12/1989 | Robitschko et al. |
| 4,940,964 A | 7/1990 | Dao |
| 4,942,393 A | 7/1990 | Waraska et al. |
| 4,983,953 A | 1/1991 | Page |
| 4,990,906 A | 2/1991 | Kell et al. |
| 5,047,629 A | 9/1991 | Geist |
| 5,049,867 A | * 9/1991 | Stouffer ....................... 340/426 |
| 5,113,182 A | 5/1992 | Suman et al. |
| 5,132,660 A | 7/1992 | Chen et al. |
| 5,134,392 A | 7/1992 | Takeuchi et al. |
| 5,146,215 A | 9/1992 | Drori |
| 5,157,375 A | * 10/1992 | Drori ......................... 340/429 |
| 5,159,334 A | 10/1992 | Baumert et al. |
| 5,160,850 A | 11/1992 | Spirig et al. |
| 5,225,672 A | 7/1993 | Jones |
| 5,313,295 A | 5/1994 | Taniguchi et al. |
| 5,315,285 A | 5/1994 | Nykerk |
| 5,479,156 A | * 12/1995 | Jones ..................... 340/825.31 |
| 5,499,196 A | 3/1996 | Pacheco |
| 5,543,776 A | * 8/1996 | L'Esperance et al. ........ 340/426 |
| 5,543,778 A | * 8/1996 | Stouffer ....................... 340/539 |
| 5,682,133 A | 10/1997 | Johnson et al. |
| 5,968,197 A | * 10/1999 | Doiron ........................ 714/748 |

* cited by examiner

*Primary Examiner*—Edward Lefkowitz
*Assistant Examiner*—Davetta W. Goins
(74) *Attorney, Agent, or Firm*—Pepper Hamilton LLP

(57) ABSTRACT

A vehicle security system 10 having an improved signaling methodology 22 which results in a decrease in the power consumed by the vehicle security system 10.

13 Claims, 3 Drawing Sheets

VEHICLE SECURITY SYSTEM

BACKGROUND OF THE INVENTION

1. Field of the Invention

The present invention relates to a vehicle security system having improved and decreased electrical power requirements due to a novel communications methodology.

2. Background

Vehicle security systems are used to prevent or to diminish the probability of theft to a vehicle or other object upon which they are deployed. While, many of these vehicle security systems adequately protect vehicles and other objects, they suffer from various drawbacks. For example and without limitation, many of these prior vehicle security systems require a relatively large amount or supply of electrical power which is usually provided by the vehicle battery. Such electrical power is required, for example, to maintain the readiness or functionality of the system receiver in order that the system be capable of responding to a transmitted signal at, what appears to the user to be, at all times.

Electrical power is also required to maintain the operability of the other and various system components such as, and without limitation, the shock sensor. Notwithstanding all of the power needed to maintain the operational readiness of these other vehicle security system components, it is widely recognized that most of the required electrical power is typically expended by the receiver. In fact, power is required by the receiver at all the times regardless of the "armed" or "disarmed" state of the system. Normally more power is needed when the receiver is placed into an "activated" state then when placed into a "waiting" or "ambient state". Failure to provide such electrical power to the receiver, typically causes the entire vehicle security system to become inoperative, a rather unacceptable circumstance.

Oftentimes vehicles having such security systems are parked for relatively large periods of time at an airport or other various locations. In such situations, many of these prior vehicle security systems cause the vehicle battery to become discharged due to the relatively large amount of power which was and is required by these vehicle security systems and due to the stationary nature of the parked vehicle which prevents the vehicle's alternator assembly from recharging the battery. In such situations, a user returns to the car, usually from a long trip, only to discover that the vehicle has become disabled and that the vehicle will not start. Such a situation is, of course most, highly undesirable and potentially dangerous.

There is therefore a need for a new and improved vehicle security system having improved power requirements and further having a new and improved and substantially reduced electrical communication methodology which substantially reduces the overall amount of required electrical power by reducing the amount of time over which the receiver must draw power in order to allow the user to reliably activate and/or operate the vehicle security system.

SUMMARY OF THE INVENTION

It is the first object of the invention to provide a vehicle security system which requires and/or draws a relatively low amount of electrical power and which overcomes some or all the drawbacks and/or deficiencies of the previously delineated prior vehicle security systems.

It is a second object of the invention to provide a new and useful vehicle security system having a new and improved communication methodology which reduces the amount of electrical power consumed by these systems.

It is a third object of this invention to provide a new and improve vehicle security system having a processor, operating under stored program control, which is activated or is adapted to draw electrical energy and/or power at levels sufficient to activate the processor only for certain time intervals of a relatively short duration of time.

According to a first aspect of the present invention, a vehicle security system is provided. The vehicle security system includes a transmitter which is adapted to selectively generate a signal having a plurality of evenly spaced preamble bits that are followed by several relatively closely spaced guard bits and at least one code word;

a receiver adapted to receive the signal and in response to the receipt of the signal to generate a second signal; and a processor coupled to the receiver and adapted to receive the second signal, and in response to the receipt of the second signal to enter an "armed mode".

According to a second aspect of the present invention, a method is provided which is effective to substantially reduce the amount of electrical power consumed by a vehicle security system of the type having a transmitter and receiver, wherein the transmitter is adapted to generate and communicate certain signals to the receiver when the receiver is activated and wherein the receiver is adapted to receive the certain signals and to consume electrical power when activated. The method, according to this second aspect of the present invention, comprises the steps of causing the certain signal to have the plurality of evenly spaced preamble bits followed by several relatively closely spaced guard bits and at least one code word; and activating the receiver for an interval of time equal to the interval of time between two adjacent bits of the plurality of the evenly spaced preamble bits and continuing to maintain the activation of the receiver only if the receiver receives one of the plurality of preamble bits during the interval of time, thereby reducing the amount of electrical power consumed by the receiver.

Further objects, features, and the advantages of the present invention will become apparent from a consideration of the following description and the appended claims.

BRIEF DESCRIPTION OF THE DRAWINGS

For a further and more complete understanding of the nature of the present invention, reference should now be made to the following drawings.

DETAILED DESCRIPTION OF THE PREFERRED EMBODIMENT OF THIS INVENTION

Figure 1:
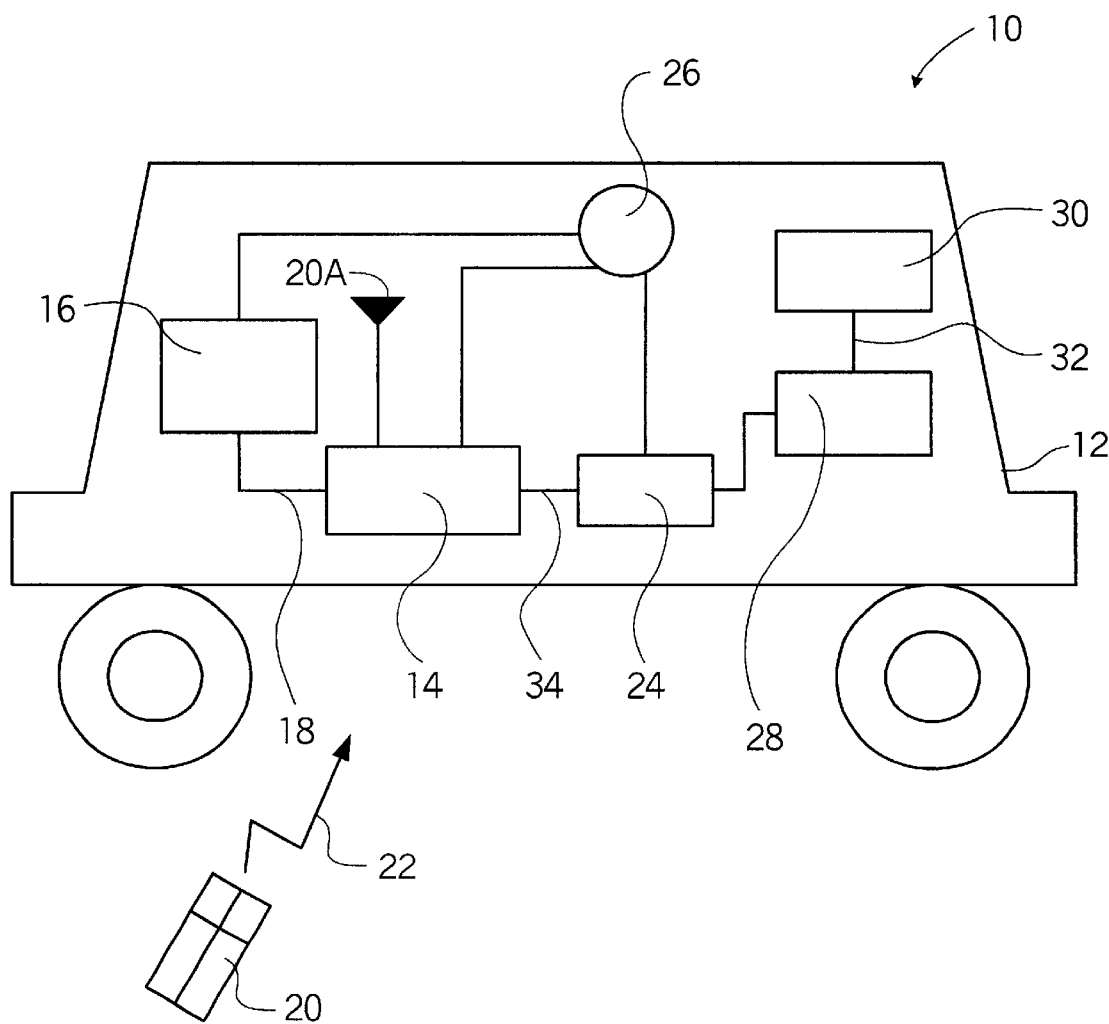
FIG. 1 is a block diagram of a vehicle having a vehicle security system made in accordance with the teachings of the preferred embodiment of this invention.

Referring now to FIG. 1, there is shown a vehicle security system 10 made in accordance with the teachings of the preferred embodiment of this invention and further shown or illustrated deployed upon and/or within a typical, conventional, and commercially available vehicle 12.

Particularly, vehicle security system 10 includes a receiver 14, normally and/or typically operating under stored program control, which is usually physically and electrically coupled to a source electrical power, such as and without limitation vehicle battery 16, by bus 18. As used herein, the term "bus" refers to one or more electrically conductive wires. Additionally, system 10 usually includes an antenna 20A which is physically and electrically coupled to a receiver 14 and which is in a communication relationship with a typical and conventional hand held transmitter 20 which is adapted to selectively generate and radiated command and control signal 22 which are received by antenna 20A and which are thereafter electrically and physically coupled to the receiver 14.

Particularly, as should be apparent to one of the ordinary skill in the art, command and control signal 22, when received by receiver 14, causes the software, firmware, and/or hardwired logic resident within receiver 14, to take certain actions and/or enter certain logic states, thereby causing the system 10 to take certain actions. Moreover, as best shown in FIG. 1, vehicle security system 10 further includes a device 24 which is connected to the ignition switch 26 and to the starter solenoid 28. Starter solenoid 28 is physically and electrically coupled to the vehicle starter 30 by means of bus 32 and is adapted, upon receipt of electrical power from battery 16 through a "turned" ignition switch 26, to provide power to starter 30 effective to "start" automobile 12 and to "start the car". As should be apparent to one of the ordinary skill in the art, inhibition device 24 may be selectively activated by processor or receiver 14 by means of one or more signals transmitted along bus 34. Moreover, inhibition device 24 is adapted, when selectively activated by receiver 14, to prevent the flow of electrical power from the battery 16 through the ignition switch 26 to the starter solenoid 28 in a manner which substantially prevent the starter motor 30 from being activated by the turning of the ignition switch 26. In essence, when activated, inhibitor 24 is adapted to normally prevent vehicle 12 from starting by use of ignition switch 26.

Figure 2:
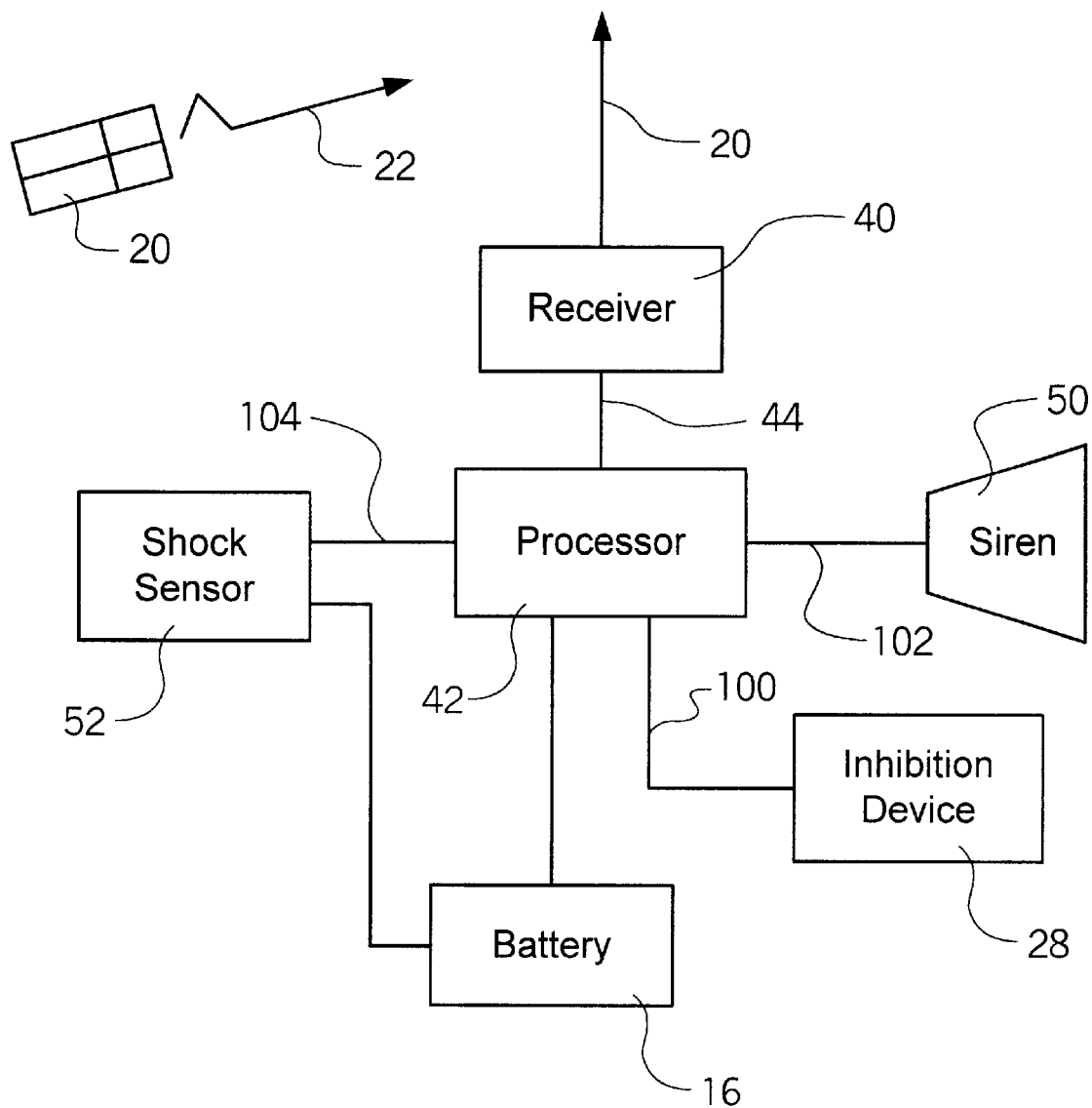
FIG. 2 is a block diagram of a vehicle security system made in accordance with the teachings of the preferred embodiment of this invention and shown, for example and without limitation, in FIG. 1

Referring now to FIG. 2, there is shown a block diagram of the vehicle security system 10. Particularly, receiver 14 includes a radio frequency receiver 40 physically and electrically coupled to antenna 20 which is in communication with a typically and/or conventional "hand-held" transmitter 20. Moreover, the receiver 40 is physically and electrically coupled to a processor 42, usually and/or typically operating under stored program control, by means of bus 44. The processor 42 is further coupled to inhibition device 28, to siren 50, and to a shock sensor 52 by respective busses 100, 102, and 104.

In operation, as should be apparent to those of ordinary skill in the art, inhibition device 28 is selectively activated by processor 42 when system 10 is placed into "armed mode". Moreover, in this "armed mode" of operation, signals which are generated by or from the shock sensor 52 and received by processor 42, are effective to cause processor 42 to activate a siren 50 (normally by allowing electrical power to be transferred to siren 50 from battery 16) in a manner which causes an alert sound or signal to be generated when attempted and unwanted tampering or intrusion into vehicle 12 occurs. The functionality and operation of a vehicle system, such as system 10, is explained within U.S. Pat. No. 5,049,867 which is owned by Applicant's assignee and which is fully and completely incorporated herein by reference, word for word and paragraph for paragraph. According to the teachings of the preferred embodiment of the present invention, processor 42 is selectively activated and powered at an "activation level" only at a certain time corresponding to a new methodology which reduces the overall electrical power consumed by system 10 while allowing receiver 14 to respond to a system user (e.g. to respond to a receipt of signal 22) at substantially all visually perceptible times.

Figure 4A:
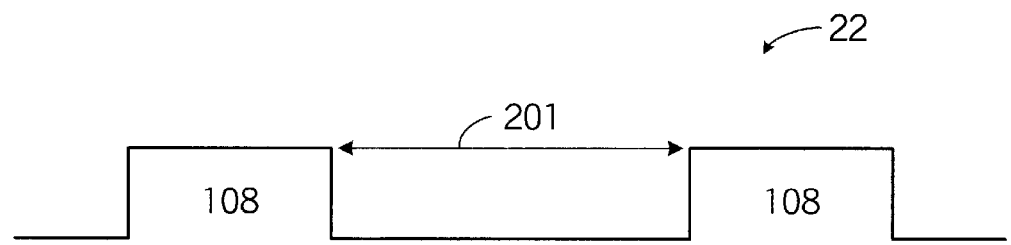
FIGS. 4(a–b) are signal diagrams illustrating the communication methodology used by certain vehicle security systems of the prior art, such as those described within the portion of this patent application entitled "Background of the Invention".
Figure 4B:
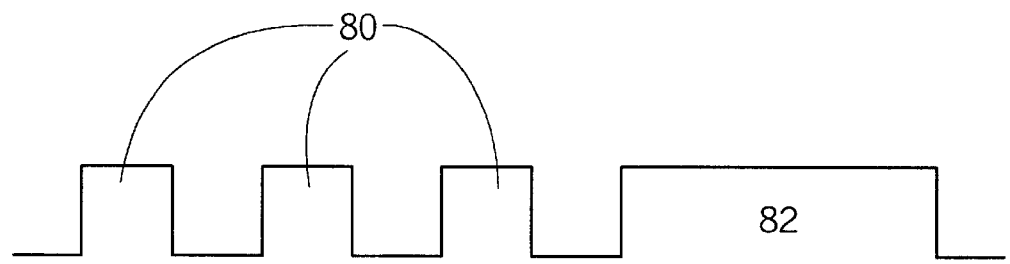

To understand this novel communication methodology employed by the vehicle security system 10 made in accordance with the teachings of the preferred embodiment of this invention, reference is now made to FIGS. 4(a–b) which illustrates the content of signal 22 according to the teachings of the prior art. Specifically, as shown, many prior art vehicle security systems utilized a signal 22 of a period having a plurality of relatively closely spaced preamble bits 80 which proceeded a single code word 82 (see FIG. 4(b)). This coding arrangement, in these prior systems, comprised a single code packet 108 which is typically transmitted at substantially evenly spaced and relatively long intervals of time 201. In this prior art arrangement such as shown in FIG. 4(a–b), a processor 42 is required to be operable for some time greater than the duration of this relatively long time interval 201, as shown in FIG. 4(a), in order to ensure that none of the code packets 108 were missed.

Figure 3:
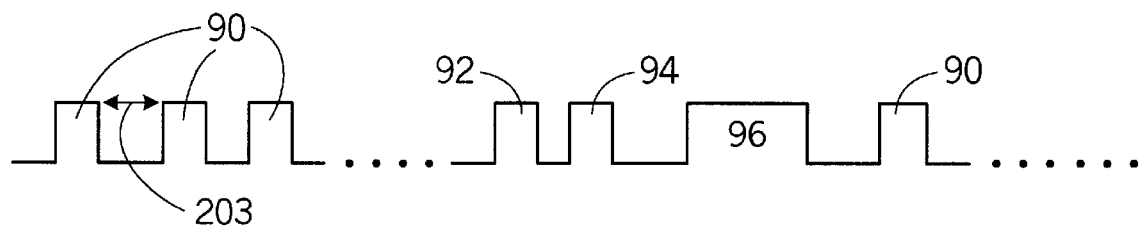
FIG. 3 is a signal diagram illustrating the communication methodology used by the vehicle security system showing in FIGS. 1, 2 and made in accordance with the teachings of the preferred embodiment of this invention.

Applicants have found that, by the use of a new signaling methodology, such as shown in FIG. 3 and associated with signal 22, processor 42 may be selectively activated for a relatively shorter period of time without missing any of the transmitted command and control signals and in a manner which reduces the consumed amount of electrical power by sytem 10.

Specifically, as shown in FIG. 3, according to the teachings of the preferred embodiment of this invention, signal 22 includes a plurality of evenly spaced preamble bits 90, followed by two guard bits 92, 94, which are then followed by a code word 96. In this signaling arrangement, as best shown in FIG. 3, processor 42 is required to be "activated" and fully powered only for a time equal to the time interval 203 between two adjacent preamble bits 90. In this manner, the receiver is "powered" for a relatively short amount of time, thereby reducing the amount of power consumed by the system 10. Hence, the vehicle security system 10, made in accordance with the teachings of the preferred embodiment of this invention, requires relatively low amount of power and reduces the overall power consumption which is inherent with many, if not most, of the vehicle security systems comprising the prior art, while ensuring that substantially every command and control signal is capable of being received and is not ignored.

It is to be understood that other changes and/or modifications may be made to the above described invention without departing from the spirit and the scope of the invention.

What is claimed is:

1. A vehicle security system comprising:
   a transmitter adapted to selectively generate a signal including preamble bits followed by guard bits and a code word;
   a receiver adapted to receive said signal; and
   a processor, coupled to said receiver and adapted to recognize said signal during a predetermined time interval corresponding to a spacing between said preamble bits, and in response to said receipt of said signal to enter a predetermined mode.

2. The vehicle security system of claim 1, wherein said predetermined mode is an armed mode, and further comprising a siren coupled to said processor and selectively activated upon receipt of said signal by said processor, thereby generating a certain sound when said processor is in said armed mode.

3. The vehicle security system of claim 1 wherein said system is adapted for use within a vehicle having a battery, a starter, and an ignition switch, said system further comprising an inhibition device, coupled to said processor, and adapted to prevent electrical power from flowing from said battery to said starter through said ignition switch.

4. The vehicle security system of claim 2 further comprising a shock sensor, coupled to said processor and adapted to generate an intrusion signal to said processor upon sensing an attempted intrusion into said vehicle, said intrusion signal being effective to cause said siren to become activated.

5. The vehicle security system of claim 1 wherein said receiver may be selectively activated, thereby reducing an amount of electrical power consumed by said receiver.

6. A method of arming a vehicle security system having a receiver and a transmitter, said method comprising the steps of:

generating a signal having a plurality of evenly spaced preamble bits followed by a plurality of relatively closely spaced guard bits and a code word; and providing a receiver which is selectively activated and which is adapted to recognize said generated signal and activate said receiver during predetermined time intervals corresponding to a spacing between said preamble bits.

7. The method of claim 5 further comprising the step of arming said system upon receipt of said generated signal.

8. The method of claim 7 further comprising the steps of providing a siren; and activating said siren upon receipt of said generated signal.

9. The method of claim 7 further comprising the steps of providing a starter inhibition device; and activating said starter inhibition device upon receipt of said generated signal.

10. The method of claim 8 further comprising the steps of providing a shock sensor which is adapted to generate an intrusion signal upon detecting tampering with said vehicle; and activating said siren when said intrusion signal is generated by said shock sensor.

11. A method to reduce the amount of electrical power consumed by a vehicle security system of the type having a transmitter adapted to generate a predetermined signal and a receiver adapted to be selectively activated and to consume electrical power when activated, said method comprising the steps of:

generating said predetermined signal to have a plurality of evenly spaced preamble bits followed by a plurality of relatively closely spaced guard bits and a code word;

activating said receiver for an interval of time equal to an interval of time between two adjacent bits of said plurality of evenly spaced preamble bits; and maintaining said activation of said receiver only if said receiver recognizes one of said plurality of preamble bits during said interval of time, thereby reducing an amount of electrical power consumed by said receiver.

12. The method of claim 11 further comprising the steps of deactivating said receiver for receipt of said code word.

13. The vehicle security system of claim 1, wherein said signal includes a plurality of evenly spaced preamble bits followed by two guard bits, and a code word.

* * * * *